United States Patent [19]
Wu

[11] Patent Number: 5,760,499
[45] Date of Patent: Jun. 2, 1998

[54] SAFETY DEVICE FOR SOCKET WHICH IS CONNECTED TO ELECTRICAL POWER SUPPLY

[76] Inventor: Se-Zhou Wu, 58, Ma Yuan West St., Taichung, Taiwan

[21] Appl. No.: 501,426

[22] Filed: Jul. 3, 1995

[30] Foreign Application Priority Data

Dec. 2, 1994 [CN] China .................. 94247056.7

[51] Int. Cl.$^6$ .................................................. H02H 4/787
[52] U.S. Cl. .................. 307/326; 361/59; 361/170; 307/327
[58] Field of Search .................. 361/59, 170, 152, 361/160, 187, 45, 50, 115; 307/326, 327, 328, 116, 125, 130, 131

Primary Examiner—William M. Shoop, Jr.
Assistant Examiner—Kim Lockett

[57] ABSTRACT

A safety device includes a comparator circuit includes three resistors arranged in series. An IC has a positive pole coupled to the resistors and has a negative coupled to the positive pole of another IC which has a negative pole coupled to the resistors. A signal output circuit includes a transistor having a base connected to the ICs and having a collector coupled to a relay. The relay includes two common contacts for selectively contacting with two normally closed contacts and two normally open contacts so as to supply electric power to the common contacts when an electric appliance is coupled between the common contacts.

2 Claims, 1 Drawing Sheet

SAFETY DEVICE FOR SOCKET WHICH IS CONNECTED TO ELECTRICAL POWER SUPPLY

BACKGROUND OF THE INVENTION

1. Field of the Invention

The present invention relates to a safety device, and more particularly to a safety device for protecting sockets which are connected to the electrical power supply.

2. Description of the Prior Art

Typical sockets which are coupled to the electric power supply have no safety devices provided for preventing the shortage of the sockets. For example, when children plug an object into the socket, the children may be hurt by the electricity.

The present invention has arisen to mitigate and/or obviate the afore-described disadvantages of the conventional sockets.

SUMMARY OF THE INVENTION

The primary objective of the present invention is to provide a safety device for enabling the sockets which are connected to the electric power supply and for preventing children from being hurt by the electric power supplied to the sockets.

In accordance with one aspect of the invention, there is provided a safety device for a socket comprising a power supply means for converting an AC current to a DC current and including a first IC for stabilizing the DC current, the first IC including at least one output, a comparator circuit means including three resistors arranged in series and having a first point V1 and a second point V2 formed therebetween, a second IC including a positive pole coupled to the first point V1 and including a negative pole, a third IC including a negative pole coupled to the second point V2 and including a positive pole coupled to the negative pole of the second IC, a third point VT being formed between the negative pole of the second IC and the positive pole of the third IC, the second IC and the third IC including an output, a first NAND gate coupled to the output of the second IC and the third IC and a second NAND gate coupled to the first NAND gate, a signal output circuit including at least one third NAND gate coupled to the second NAND gate, a transistor including a base connected to the third NAND gate and including a collector and an emitter, a relay coupled to the power supply means and including two first common contacts, a first normally closed contact coupled to the output of the power supply means, a second normally closed contact grounded, and two normally open contacts connected to the power supply means, an induction coil coupled to the a first of the normally open contact, a socket coupled between the two first common contacts, and a locking circuit including a fourth IC coupled to the induction coil and a fifth IC coupled to the fourth IC and having an output, a diode coupled to the output of the fifth IC and coupled to the third NAND gate. The common contacts are coupled to the normally closed contacts when the relay is not actuated. The common contacts are coupled to the normally open contacts when the relay is actuated, in order to supply electric power to the socket. The locking circuit maintains the common contacts in contact with the normally open contacts.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
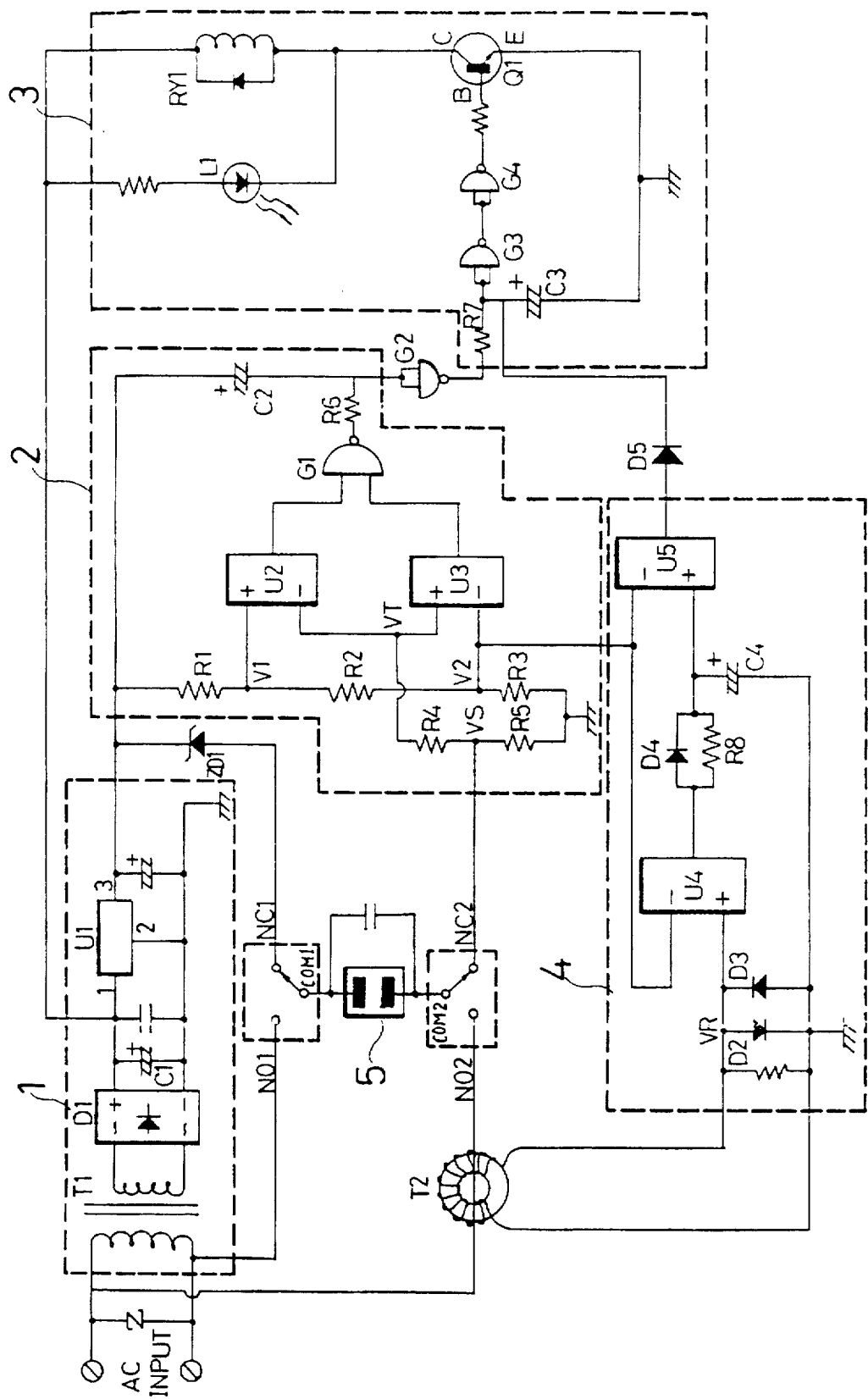
FIG. 1 is an electric circuit showing the safety device in accordance with the present invention.

Referring to FIG. 1, a safety device in accordance with the present invention comprises a power circuit 1 including a transformer T1 coupled to an electric power supply for receiving AC current therefrom, and including a bridge rectifier D1, a capacitor filter C1 and a first integrated circuit U1 (abbreviated as IC hereinafter) for converting the electric power into a stable DC power output and for stabilizing the DC power output.

A comparator circuit 2 comprises a second IC (U2) including a positive pole connected to one point V1 of a series of resistors R1, R2,R3, and a third IC (U3) including a negative pole connected to another point V2 of the series of the resistors R1, R2, R3. The negative pole of the second IC (U2) is connected to the positive pole of the third IC (U3) and has a point VT grounded via two resistors R4, R5. The output of the ICs (U2, U3) are coupled to a NAND gate G1 which includes an output connected to a resistor R6 which is connected to the third leg of the first IC (U1) via a capacitor C2 and which is connected to another NAND gate G2 of a signal output circuit 3.

The signal output circuit 3 includes the NAND gate G2 having an output connected to the base B of a transistor Q1 via a resistor R7 and two NAND gates G3 and G4. The emitter E of the transistor Q1 and a capacitor C3 are grounded or are equivalently coupled to the second leg of the first IC (U1). The collector C of the transistor Q1 is coupled to a relay RY1 and an indicating light L1. A socket 5 is disposed in parallel to the relay RY1 and connected between two common contacts COM1 and COM2. The socket 5 includes a normally closed contact NC1 connected to the third leg of the first IC (U1) via a diode ZD1, a normally open contact NO1 coupled to one pole of the AC power supply, another normally open contact NO2 coupled to the other pole of the AC power supply via an induction coil T2 which may convert the current to a voltage output signal, and another normally closed contact NC2 coupled to the resistor R5 at a contact VS so as to provide a voltage for comparing purposes.

A locking circuit 4 includes two ICs (U4 and U5 coupled to the induction coil T2 for receiving the voltage output signal therefrom. Two diodes D2, D3 are arranged in parallel to each other and arranged in reverse direction for limiting the amplitude of the signal from the induction coil T2 to the positive pole of the IC (U4). The negative pole of the IC (U4) is coupled to the negative poles of both of the ICs (U3, U5). The output of the IC (U4) is coupled to the positive pole of the IC (U5) via a diode D4 and a resistor R8 which are arranged in parallel to each other. A capacitor C4 is coupled to the positive pole of the IC (U5) so as to stable the signal. The output of the IC (U5) is coupled to the input of the NAND gate G3 via a diode D5.

In operation, as shown in FIG. 1, when the socket 5 is unloaded or no electrical appliances are connected to the socket 5, the two normally closed contacts NC1 and NC2 of the relay RY1 are coupled to the socket 5 such that the socket 5 is not connected to the AC power supply. Accordingly, the children will not be hurt when the children plug objects into the socket.

When an electrical appliance is plugged into the socket 5 and is switched on such that the socket 5 is loaded, a closed circuit is formed and includes the stable DC power output from the third leg of the first IC (U1), the normally closed contact NC1, the load of the socket 5, the normally closed contact NC2 and the resistor R5 which is then grounded. A voltage VS will thus be formed and transmitted to the point VT which is connected to the negative pole of IC (U2) and to the positive pole of IC (U3). At this moment, VS equals to VT, and the resistor R4 has no voltage drop. The voltage of VT is compared in the comparator circuit 2. When VT is smaller than V1 and higher than V2; i.e., V1>VT>V2, both the outputs of the ICs (U2 and U3) will include higher voltages which are then transmitted to the resistor R7 of the signal output circuit 3 via the NAND gates G1 and G2. The resistor R6 and the capacitor C2 form a RC circuit for eliminating disordered signals. The high voltage from the NAND gate G2 is transmitted to NAND gates G3, G4 via a delay circuit including the resistor R7 and the capacitor C3, in order to actuate the transistor Q1. The indicator light L1 is then energized and the relay RY1 is actuated in order to connect the common contacts COM1 and COM2 to the normally open contacts N01 and N02. At this moment, the external AC power supply is coupled to the socket so as to energize the electric appliance.

The induction coil T2 may also receive a voltage signal VR from the AC power supply. The voltage is then transmitted to the IC (U4) via the diodes D2, D3 which may be provided to limit the amplitude of the voltage signal and to prevent the IC (U4) from being damaged.

If the voltage V2 is far less than the voltage signal VR, the signal VR will be amplified by the ICs (U4, U5) and will become a high voltage which is then transmitted to the NAND gate G3 of the signal output circuit 3 via the diode D5. The signal output circuit 3 may be actuated continuously in order to energize the relay RY1 so as to constantly couple the common contacts COM1 and COM2 to the normally open contacts NO1 and NO2, such that the AC power supply may be constantly supplied to the electric appliance in order to energize the electric appliance.

When the relay RY1 is actuated, the circuit including the diode ZD1, NC1, socket 5, NC2, and the resistor R5 is opened such that voltage VT is less than V2 which is less than V1, i.e., VT<V2<V1. A high voltage output will be generated from the ICs (U2, U3) via the NAND gate G1. A lower voltage may be formed in the resistor R7 when the high voltage signal is transmitted through the NAND gate G2. However, the locking circuit 4 has a high voltage output to the resistor R7 in order to actuate the signal output circuit 3. Therefore, the output signal from the comparator circuit 2 may not be transmitted into the signal output circuit 3. The locking circuit 4 may thus amplify the current so as to continuously actuating the signal output circuit 3. The relay RY1 is actuated in order to constantly supply electric power supply to the socket 5.

The relationships between the voltages VT, V1 and V2 are as follows:

(1) when the socket is unloaded, V1>V2>VT, the NAND gate G1 has a high voltage output, the relay RY1 is off such that no AC power supply is coupled to the socket 5.

(2) when the socket is shortaged, VT>V1>V2, the NAND gate G1 has a high voltage output such that the relay RY1 is off and such that no AC power supply is coupled to the socket 5.

(3) when an electric appliance is plugged to the socket 5 and is switched on, V1>VT>V2, the NAND gate G1 has a low voltage, the relay RY1 is actuated. At this moment, the AC power supply is coupled to the socket in order to supply electric power to the socket 5.

Accordingly, the safety device in accordance with the present invention is safe and has no electric power supplied thereto such that the children will not be hurt when the children plug any other object into the socket.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A safety device for a socket comprising:

a power supply means including a first IC having at least one output, a comparator circuit means including a first, second and third resistors arranged in series, a second IC including a positive pole coupled to a first point between said first and second resistors and including a negative pole, a third IC including a negative pole coupled to a second point between said second and third resistors and including a positive pole coupled to said negative pole of said second IC, a first point VT being formed between said negative pole of said second IC and said positive pole of said third IC, said first point VT being grounded via a fourth and fifth resistors arranged in series, said second IC and said third IC including an output, a signal output circuit including at least one NAND gate coupled to said output of said second IC and said third IC, a transistor including a base connected to said NAND gate and including a collector and an emitter, a relay coupled to said power supply means and including two first common contacts, a first normally closed contact coupled to said output of said power supply means, a second normally closed contact grounded, and two normally open contacts connected to said power supply means, a socket coupled between said two first common contacts, and said common contacts being coupled to said normally closed contacts when said relay is not actuated, said common contacts being coupled to said normally open contacts when said relay is actuated, in order to supply electric power to said socket.

2. A safety device for a socket comprising:

a power supply means for converting an AC current to a DC current and including a first IC for stabilizing said DC current, said first IC including at least one output, a comparator circuit means including a first, second and third resistors arranged in series and having a first point V1 between said first and second resistors and a second point V2 between said second and third resistors, a second IC including a positive pole coupled to said first point V1 and including a negative pole, a third IC including a negative pole coupled to said second point V2 and including a positive pole coupled to said negative pole of said second IC, a first point VT being formed between said negative pole of said second IC and said positive pole of said third IC, said second IC and said third IC including an output, a first NAND gate coupled to said output of said second IC and said third IC and a second NAND gate coupled to said first NAND gate, a signal output circuit including at least one third NAND gate coupled to said second NAND gate, a transistor including a base connected to said third NAND gate and including a collector and an emitter, a relay coupled to said power supply means and including two first common contacts, a first normally closed contact coupled to said output of said power supply means, a second normally closed contact grounded, two normally open contacts connected to said power supply means, an induction coil coupled to said a first of said normally open contact, a socket coupled between said two first common contacts, a locking circuit including a fourth IC coupled to said induction coil and a fifth IC coupled to said fourth IC and having an output, a diode coupled to said output of said fifth IC and coupled to said third NAND gate, and said common contacts being coupled to said normally closed contacts when said relay is not actuated, said common contacts being coupled to said normally open contacts when said relay is actuated, in order to supply electric power to said socket, said locking circuit maintaining said common contacts in contact with said normally open contacts.

* * * * *